(12) United States Patent
Hoye

(10) Patent No.: US 11,402,660 B1
(45) Date of Patent: Aug. 2, 2022

(54) MULTIPLY ADJUSTABLE EYEGLASS FRAMES

(71) Applicant: Mary Ellen Hoye, Homer Glen, IL (US)

(72) Inventor: Mary Ellen Hoye, Homer Glen, IL (US)

(*) Notice: Subject to any disclaimer, the term of this patent is extended or adjusted under 35 U.S.C. 154(b) by 144 days.

(21) Appl. No.: 16/571,778

(22) Filed: Sep. 16, 2019

(51) Int. Cl.
G02C 5/20 (2006.01)
G02C 5/22 (2006.01)

(52) U.S. Cl.
CPC ............ *G02C 5/20* (2013.01); *G02C 5/2209* (2013.01); *G02C 2200/26* (2013.01)

(58) Field of Classification Search
CPC ..... G02C 5/20; G02C 5/2209; G02C 2200/26
USPC .......................................... 351/41, 111, 118
See application file for complete search history.

(56) References Cited

U.S. PATENT DOCUMENTS

| | | | | |
|---|---|---|---|---|
| 5,289,592 A * | 3/1994 | Paivarinta | ............... | A61F 9/025 2/431 |
| 5,760,867 A * | 6/1998 | Pernicka | ................... | G02C 1/04 351/118 |
| 6,278,788 B1 * | 8/2001 | Landis | ..................... | A61F 9/045 16/228 |
| 6,332,681 B1 * | 12/2001 | Li | ......................... | G02C 5/2263 351/119 |
| 6,776,483 B1 * | 8/2004 | Wu | .......................... | G02C 5/20 351/119 |
| 9,164,293 B2 * | 10/2015 | Farnam | .................... | G02C 5/20 |
| 2014/0146282 A1 * | 5/2014 | Lu | .......................... | G02C 5/045 351/118 |

\* cited by examiner

*Primary Examiner* — Tuyen Tra
(74) *Attorney, Agent, or Firm* — Clifford H. Kraft

(57) ABSTRACT

Eyeglass frames that are both adjustable fore and aft on each side, and that allow each lens to be raised or lowered slightly so that the glasses fit well with both lenses at the same vertical level. Embodiments of the present invention includes a small ratchet and hinge on each arm that allows the forward part of the frame to rotate slightly up or down. In addition, in other embodiments, both legs can have a sliding length adjustment that allows the leg to fit snugly behind the ear on each side with the lens in the correct fore and aft position. Some embodiments of the present invention have both features present, while other embodiments have only one or the other feature.

1 Claim, 4 Drawing Sheets

MULTIPLY ADJUSTABLE EYEGLASS FRAMES

BACKGROUND

Field of the Invention

The present invention relates generally to the field of personal use devices and more particularly to multiply adjustable eyeglass frames.

Description of the Problem Solved

It is a medical fact that people's bodies are not totally symmetrical left and right. In particular, various individuals' face and head features are slightly different on the right side when compared with the left side. The nose may be slightly skewed to one side or the other; one ear may be just slightly higher than the other ear. Thus, in many cases, eyeglasses do not rest totally straight on a person's face. Rather, many people find that their eyeglasses tilt a little with one lens being slightly higher than the other lens. In general, this is due to the ears not being exactly the same height; it may also be caused by an asymmetry in the nose, or both. What is badly needed is eyeglass frames that can be adjusted to compensate for this asymmetry so that both lenses are worn at the same height.

Additionally, the distance from the front of the face to the ears is different on different individuals, and the distance may not be the same on both sides of the head of the same individual. Stock eyeglass frames come in standard sizes with frames for men being slightly larger than frames for women. So, in addition to eyeglass frames that allow the lenses to be adjusted up and down, it would also be very advantageous to have eyeglass frames that allow the arms to be individually adjustable fore and aft. The combination of both features would allow individual adjustment of each lens fore and aft and up and down with respect to the face and the other lens.

SUMMARY OF THE INVENTION

The present invention relates to eyeglass frames that are both adjustable fore and aft on each side, and that allow each lens to be raised or lowered slightly so that the glasses fit well with both lenses at the same vertical level.

One embodiment of the present invention includes a small ratchet and hinge on each arm that allows the forward part of the frame to rotate slightly up or down. In other embodiments, both legs can have a sliding length adjustment that allows the leg to fit snugly behind the ear on each side with the lens in the correct fore and aft position. Some embodiments of the present invention have both features present, while other embodiments have only one or the other feature.

The hinge is typically a small circular disk that is approximately the same diameter as the size of the leg. Interior to the hinge is a series of small locking teeth that act as a ratchet. A small button in the center of the hinge allows the individual frame to be ratcheted upward or downward.

The sliding length adjustment includes two parts of the leg that can slide over each other with the total outside perimeter and/or diameter to remaining the same. Again, a small set of teeth lock the leg at a desired length. A small button releases the sliding mechanism so that the length of each leg can be individually adjusted.

DESCRIPTION OF THE FIGURES

Attention is now directed to several figures that illustrate features of the present invention.

Several drawings and illustrations have been presented to aid in understanding the present invention. The scope of the present invention is not limited to what is shown in the figures.

DESCRIPTION OF THE PREFERRED EMBODIMENTS

The present invention relates to eyeglass frames that allow the lenses to be adjusted up and down and fore and aft.

Figure 1B:
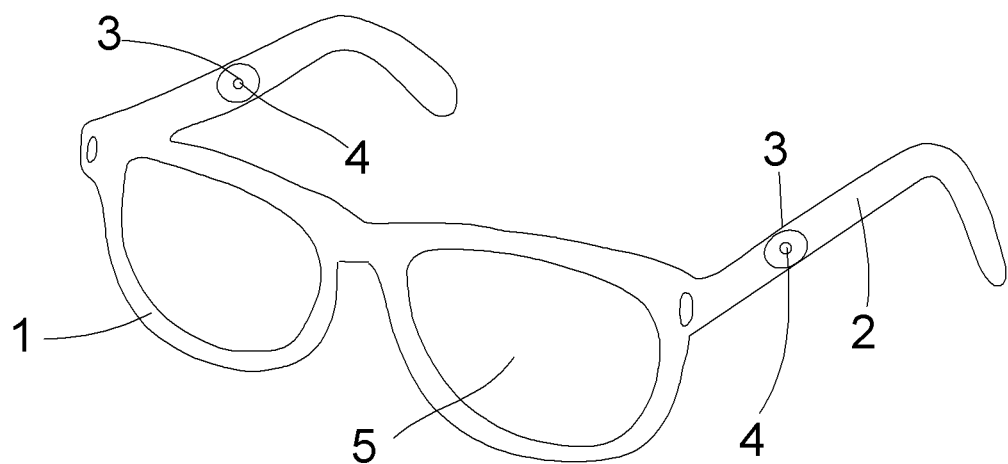
FIG. 1B shows the embodiment of FIG. 1A with the lens shown in the straight position.
Figure 1A:
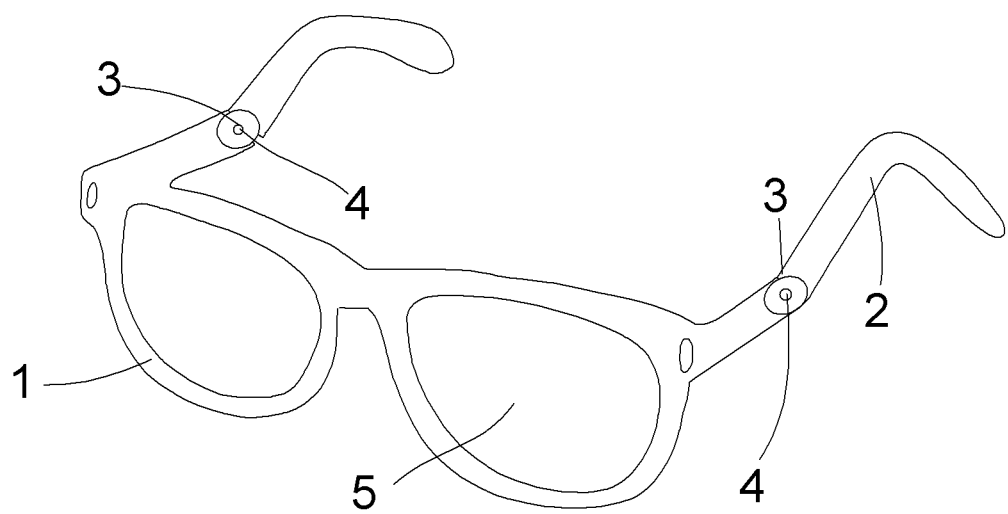
FIG. 1A shows an embodiment of the present invention with a ratchet adjustment of each lens up and down—the lens shown in an offset position.

FIG. 1A shows an embodiment of the present invention that allows the lenses to be adjusted up and down. The frame 1 has legs 2 that extend out beyond the ear in the normal fashion. Each legs has a small circular hinge 3 with an internal ratchet (See FIG. 4A) and a button 4 in the center of the hinge 3 or associated with the hinge. Depressing the button 4 releases the ratchet and allows the forward part of the leg to rotate slightly up or down. Releasing the button 4 locks the ratchet with the lens 5 in the new position. Since there are similar hinge/ratchets on each leg 2, each leg can be adjusted independently of the other leg. The lens in FIG. 1A is shown in the ratcheted or adjusted position. FIG. 1B shows the embodiment of FIG. 1A with the lens in the straight position.

Figure 2:
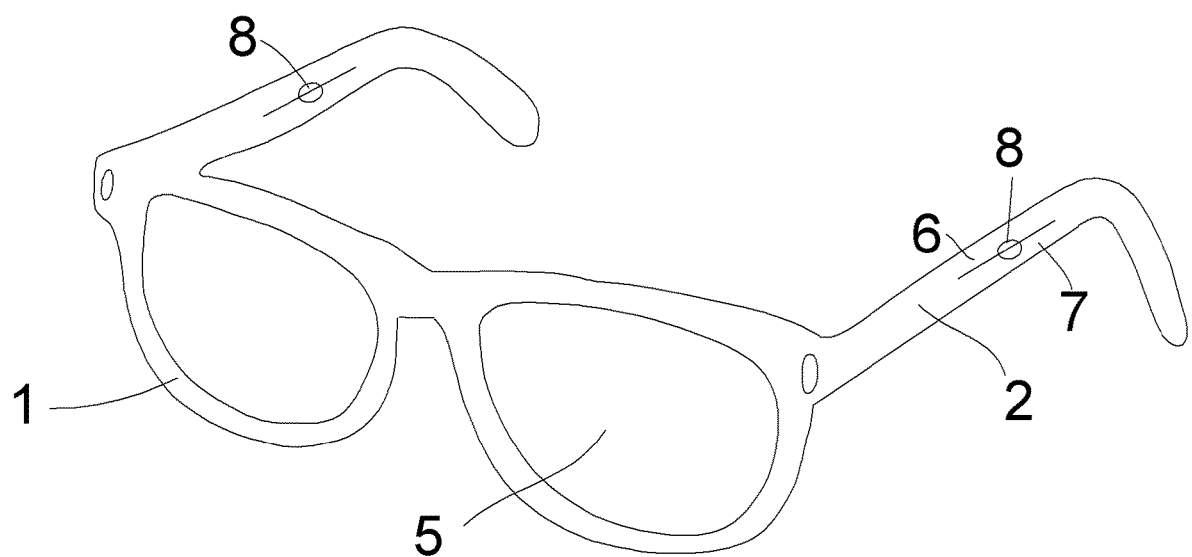
FIG. 2 shows an embodiment of the present invention with a sliding length adjustment on each leg.

FIG. 2 shows a embodiment of the present invention that allows the legs 2 to be extended and retracted independently of one another. Each leg 2 is split into a first section 6 and a second section 7 which can slide over each other. Depressing button 8 releases a stop from an internal set of teeth (See FIG. 4B) allowing the two sections 6 and 7 to slide relative to one another. Releasing button 8 locks the leg 2 at the selected length.

Figure 3:
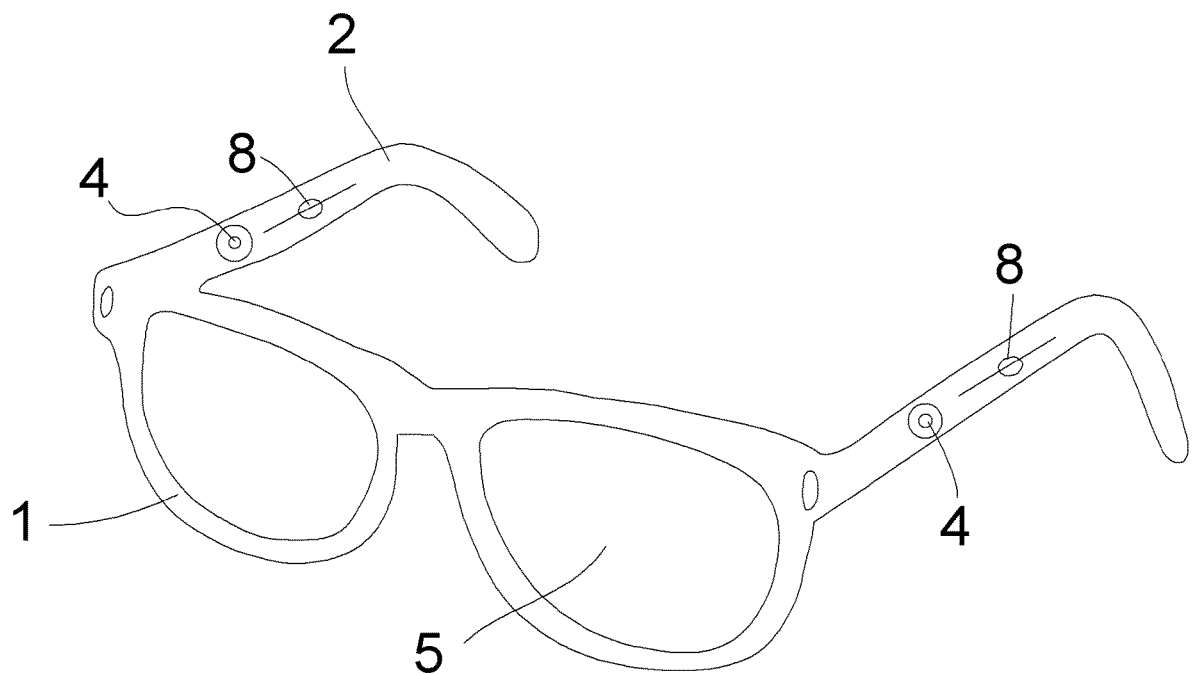
FIG. 3 shows an embodiment of the present invention with both the features of FIGS. 1 and 2.

FIG. 3 shows an embodiment of the present invention with both the vertical lens positioning hinge and the sliding legs. This embodiment allows totally customization of the frame for an individual wearer.

Figure 4A:
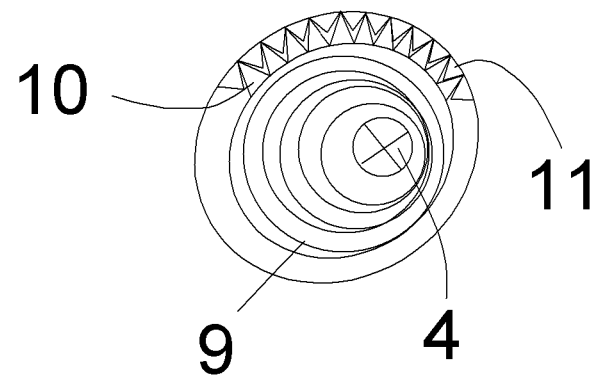
FIG. 4A shows a detail of the circular hinge and ratchet.

FIG. 4A shows a detail of the hinge 3. The hinge has an internal bias spring 9 and two sets of teeth 10, 11. The button 4 compresses the spring 9 and releases a first set of teeth 11 from the second set 10 allowing the hinge 3 to rotate. Releasing the button 4 relaxes the spring 9 and causes the teeth 10, 11 to re-engage locking the ratchet.

Figure 4B:
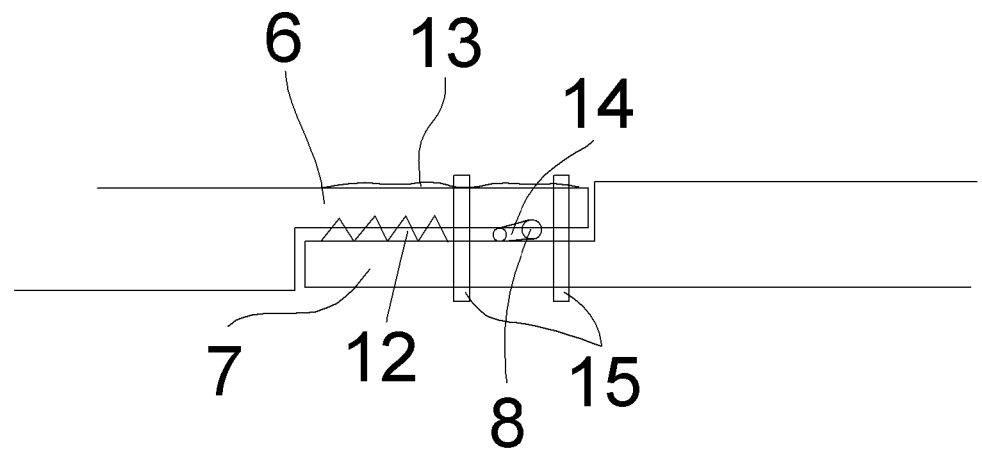
FIG. 4B shows a detail of the sliding length adjustment mechanism.

FIG. 4B shows a detail of the sliding length adjustment. The legs 2 are split into an upper section 6 and a lower section 7. Each of these sections has a set of teeth 12. A button 8 is biased by a small leaf spring 13. When the button 8 is depressed, the two sections 6, 7 are levered apart by a small lever 14 disengaging the teeth 12 allowing the sections to slide relative to one another. Small hoops 15 prevent the sections from totally separating. Releasing the button 8 allows the teeth 12 to engage locking the selected leg length.

Embodiments of the present invention can be made with polymer frames known in the art and metal pieces for the hinges and springs. Alternatively, the entire assembly can be fabricated from plastic or any other semi-rigid material. The invention can be supplied in different overall sizes to increase the range of adjustable movements.

Another alternate embodiment of the present invention can be sold as OEM equipment and fitted to existing frames to allow adjustment of the lenses.

Several descriptions and illustrations have been provided to aid in understanding the present invention. One with skill in the art will realize that numerous changes and variations may be made without departing from the spirit of the invention. Each of these changes and variations is within the scope of the present invention.

I claim:

1. An adjustable eyeglass frame comprising:

a lens portion with a right lens holder and left lens holder, the lens portion attached to two extended legs, each leg including a circular rotating hinge with an internal bias spring and ratchet allowing independent adjustment of the vertical position of each lens with respect to the other lens; a first button that releases the ratchet allowing said adjustment of the vertical position;

a sliding adjustable length adjustment on each leg allowing independent adjustment of length of each of the legs relative to the other leg; a second button that releases the length adjustment allowing said adjustment of the length of the leg; the sliding adjustable length adjustment of each leg comprising:

the leg having an upper section and a lower section, the upper section constructed to slide along the lower section, each of the upper and lower sections each having a set of engaging teeth; a leaf spring biasing the upper section to the lower section with the engaging teeth engaged, the second button separating the upper section from the lower section so that the length can be adjusted; a pair of hoops circling the upper and lower sections preventing them from completely separating.

* * * * *